(12) United States Patent (10) Patent No.: US 12,592,228 B2
Tian et al. (45) Date of Patent: Mar. 31, 2026

(54) SPEECH INTERACTION METHOD, AND APPARATUS, COMPUTER READABLE STORAGE MEDIUM, AND ELECTRONIC DEVICE

(71) Applicant: Shenzhen Horizon Robotics Technology Co., Ltd., Guangdong (CN)

(72) Inventors: Chuan Tian, Guangdong (CN); Fuping Pan, Guangdong (CN); Jianwei Niu, Guangdong (CN); Kai Yu, Guangdong (CN)

(73) Assignee: Shenzhen Horizon Robotics Technology Co., Ltd., Guangdong (CN)

( * ) Notice: Subject to any disclaimer, the term of this patent is extended or adjusted under 35 U.S.C. 154(b) by 377 days.

(21) Appl. No.: 18/247,441

(22) PCT Filed: Feb. 16, 2022

(86) PCT No.: PCT/CN2022/076422
§ 371 (c)(1),
(2) Date: Mar. 30, 2023

(87) PCT Pub. No.: WO2022/193892
PCT Pub. Date: Sep. 22, 2022

(65) Prior Publication Data
US 2024/0005917 A1 Jan. 4, 2024

(30) Foreign Application Priority Data
Mar. 16, 2021 (CN) .......................... 202110279812.4

(51) Int. Cl.
*G10L 15/08* (2006.01)
*G10L 15/14* (2006.01)
(Continued)

(52) U.S. Cl.
CPC .......... *G10L 15/1822* (2013.01); *G10L 15/08* (2013.01); *G10L 15/083* (2013.01);
(Continued)

(58) Field of Classification Search
None
See application file for complete search history.

(56) References Cited

U.S. PATENT DOCUMENTS

| | | | | | |
|---|---|---|---|---|---|
| 5,937,383 | A | * | 8/1999 | Ittycheriah | .......... G10L 21/0272 704/255 |
| 6,741,963 | B1 | * | 5/2004 | Badt | ....................... G10L 15/22 704/E15.04 |

(Continued)

FOREIGN PATENT DOCUMENTS

| | | |
|---|---|---|
| CN | 1455387 A | 11/2003 |
| CN | 108510990 A | 9/2018 |

(Continued)

OTHER PUBLICATIONS

JP2022558093 Written Amendment dated Sep. 11, 2025. (Year: 2025).*

(Continued)

*Primary Examiner* — Richard Z Zhu
(74) *Attorney, Agent, or Firm* — K&L Gates LLP

(57) ABSTRACT

Disclosed are a speech interaction method, computer readable storage medium, and electronic device, improving processing efficiency in multi-channel speech interaction scenarios with low resource consumption and processing delay. The method includes: obtaining at least one channel of audio signal; recognizing the at least one channel of audio signal using a preset speech recognition model, to obtain a first type of recognition result; determining stored recognition data from a buffer; generating a second type of recognition result based on the stored recognition data; processing (Continued)

| |
|---|
| Determine a syllable set respectively corresponding to at least one channel of audio signal and a first probability score respectively corresponding to a syllable in the syllable set by using an acoustic submodel included in a speech recognition model — 2024 |

↓

| |
|---|
| Determine a word set respectively corresponding to the at least one channel of audio signal by using a language submodel included in the speech recognition model — 2025 |

↓

| |
|---|
| For a word in the word set, determine whether a second probability score corresponding to the word exists in the buffer, where if the second probability score corresponding to the word does not exist, the second probability score corresponding to the word is determined by using the language submodel — 2026 |

↓

| |
|---|
| Determine a first type of recognition result based on the first probability score and the second probability score that is determined by the language submodel — 2027 | the first and second type of results using the model, to obtain at least one statement recognition result corresponding to the at least one channel of audio signal; performing semantic parsing on the statement recognition result, to obtain at least one parsing result; and generating, based on the at least one parsing result, an instruction for controlling a speech interaction device to perform a corresponding function.

15 Claims, 8 Drawing Sheets

(51) Int. Cl.
  G10L 15/18          (2013.01)
  G10L 15/22          (2006.01)
  G10L 15/28          (2013.01)
  *G10L 15/183*          (2013.01)
(52) U.S. Cl.
  CPC .............. G10L 15/14 (2013.01); G10L 15/18 (2013.01); G10L 15/1815 (2013.01); G10L 15/22 (2013.01); G10L 15/285 (2013.01); *G10L 15/142* (2013.01); *G10L 15/183* (2013.01); *G10L 2015/223* (2013.01)

(56) References Cited

U.S. PATENT DOCUMENTS

| | | | | |
|---|---|---|---|---|
| 6,823,307 | B1 * | 11/2004 | Steinbiss | G10L 15/197 |
| | | | | 704/251 |
| 7,983,912 | B2 * | 7/2011 | Hirakawa | G10L 15/22 |
| | | | | 704/235 |
| 8,271,282 | B2 * | 9/2012 | Harada | G10L 15/08 |
| | | | | 704/251 |
| 9,524,718 | B2 | 12/2016 | Obuchu et al. | |
| 9,858,922 | B2 * | 1/2018 | Weinstein | G10L 15/285 |
| 10,228,905 | B2 | 3/2019 | Nakayama et al. | |
| 10,311,860 | B2 * | 6/2019 | Aleksic | G10L 15/197 |
| 10,650,802 | B2 | 5/2020 | Kunitake et al. | |
| 11,145,314 | B2 | 10/2021 | Peng et al. | |
| 2010/0010813 | A1 * | 1/2010 | Harada | G10L 15/08 |
| | | | | 704/E17.001 |
| 2011/0029311 | A1 * | 2/2011 | Minamino | G10L 15/183 |
| | | | | 704/251 |
| 2016/0284349 | A1 * | 9/2016 | Ravindran | G10L 15/285 |
| 2016/0358606 | A1 * | 12/2016 | Ramprashad | G10L 15/32 |
| 2017/0229124 | A1 * | 8/2017 | Strohman | G10L 15/32 |
| 2017/0236518 | A1 * | 8/2017 | Lane | G10L 15/14 |
| | | | | 704/240 |
| 2018/0233131 | A1 * | 8/2018 | Aleksic | G10L 15/187 |
| 2019/0279646 | A1 * | 9/2019 | Tian | G10L 15/20 |
| 2020/0152188 | A1 * | 5/2020 | Lee | G10L 15/22 |
| 2021/0090552 | A1 * | 3/2021 | Tanaka | G10L 25/30 |
| 2021/0191952 | A1 * | 6/2021 | He | G06F 16/90332 |
| 2021/0225366 | A1 * | 7/2021 | Chen | G10L 15/02 |
| 2022/0036877 | A1 * | 2/2022 | Baba | G10L 15/25 |
| 2022/0277005 | A1 * | 9/2022 | Gao | G06F 16/243 |

FOREIGN PATENT DOCUMENTS

| | | |
|---|---|---|
| CN | 108573706 A | 9/2018 |
| CN | 109215630 A | 1/2019 |
| CN | 109727603 A | 5/2019 |
| CN | 110415697 A | 11/2019 |
| CN | 110473531 A | 11/2019 |
| CN | 110534095 A | 12/2019 |
| CN | 110661927 A | 1/2020 |
| CN | 112071310 A | 12/2020 |
| CN | 113066489 A | 7/2021 |
| EP | 3425628 A1 | 1/2019 |
| JP | 2004198597 A | 7/2004 |
| JP | 2007093789 A | 4/2007 |
| JP | 2013080476 A | 5/2013 |
| JP | 2013218095 A | 10/2013 |
| JP | 2017156839 A | 9/2017 |
| WO | 0038175 A1 | 6/2000 |
| WO | 2022193892 A1 | 9/2022 |

OTHER PUBLICATIONS

JP2022558093 Trial and Appeal Decision dated Dec. 9, 2025. (Year: 2025).*

First Chinese Office Action and its Search Report from corresponding Chinese Application No. 202110279812.4, mailed on Aug. 24, 2023 (English translation).

First Japanese Office Action from Japanese Application No. 2022-558093, mailed on Nov. 28, 2023 (English translation).

The Second Chinese Office Action from the corresponding Chinese Patent Application No. 202110279812.4, mailed on Apr. 1, 2024 (Original and English Version).

The Second Japanese Office Action from the corresponding Japanese Patent Application No. 2022-558093, mailed on May 7, 2024 (Original and English Version).

* cited by examiner

100

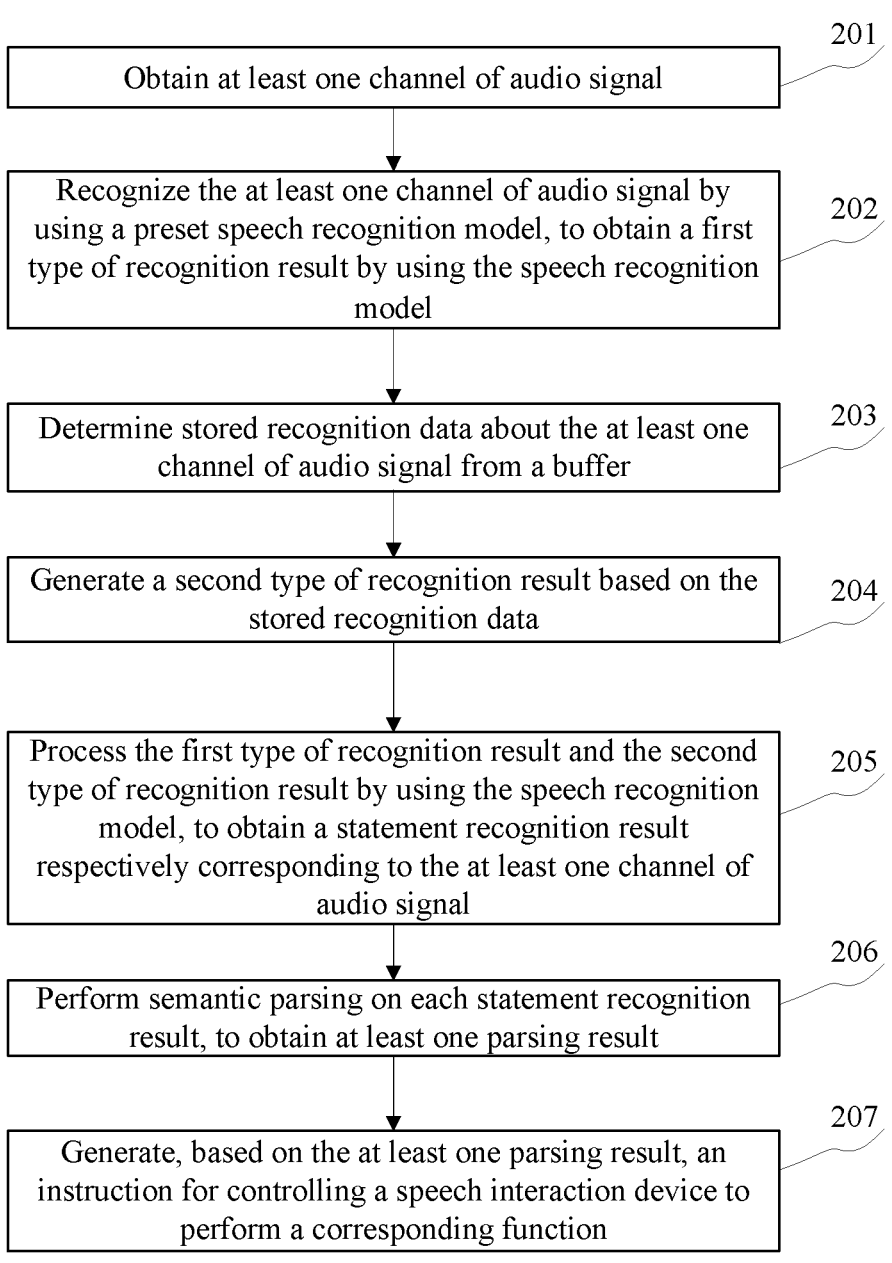

201

Obtain at least one channel of audio signal

202

Recognize the at least one channel of audio signal by using a preset speech recognition model, to obtain a first type of recognition result by using the speech recognition model

203

Determine stored recognition data about the at least one channel of audio signal from a buffer

204

Generate a second type of recognition result based on the stored recognition data

205

Process the first type of recognition result and the second type of recognition result by using the speech recognition model, to obtain a statement recognition result respectively corresponding to the at least one channel of audio signal

206

Perform semantic parsing on each statement recognition result, to obtain at least one parsing result

207

Generate, based on the at least one parsing result, an instruction for controlling a speech interaction device to perform a corresponding function

Fig. 2

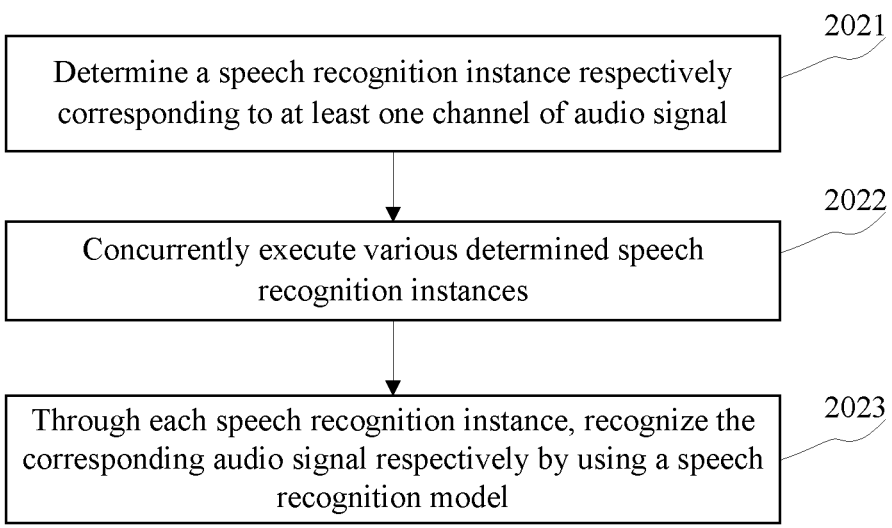

2021

Determine a speech recognition instance respectively corresponding to at least one channel of audio signal

2022

Concurrently execute various determined speech recognition instances

2023

Through each speech recognition instance, recognize the corresponding audio signal respectively by using a speech recognition model

Fig. 3

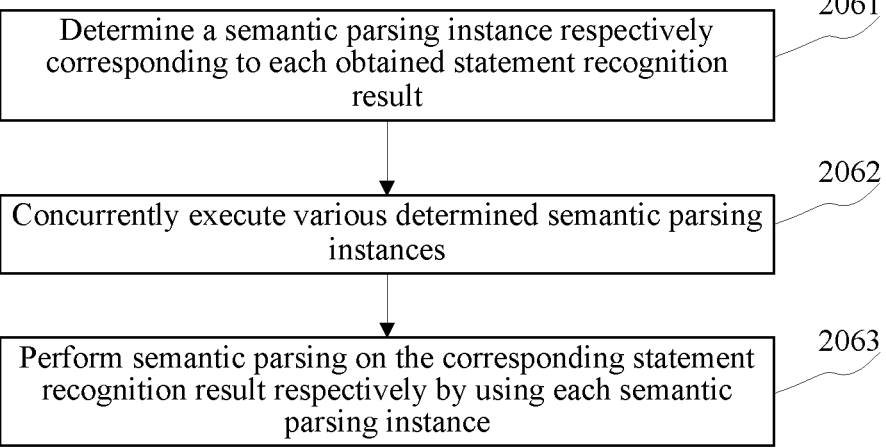

2061

Determine a semantic parsing instance respectively corresponding to each obtained statement recognition result

2062

Concurrently execute various determined semantic parsing instances

2063

Perform semantic parsing on the corresponding statement recognition result respectively by using each semantic parsing instance

Fig. 4

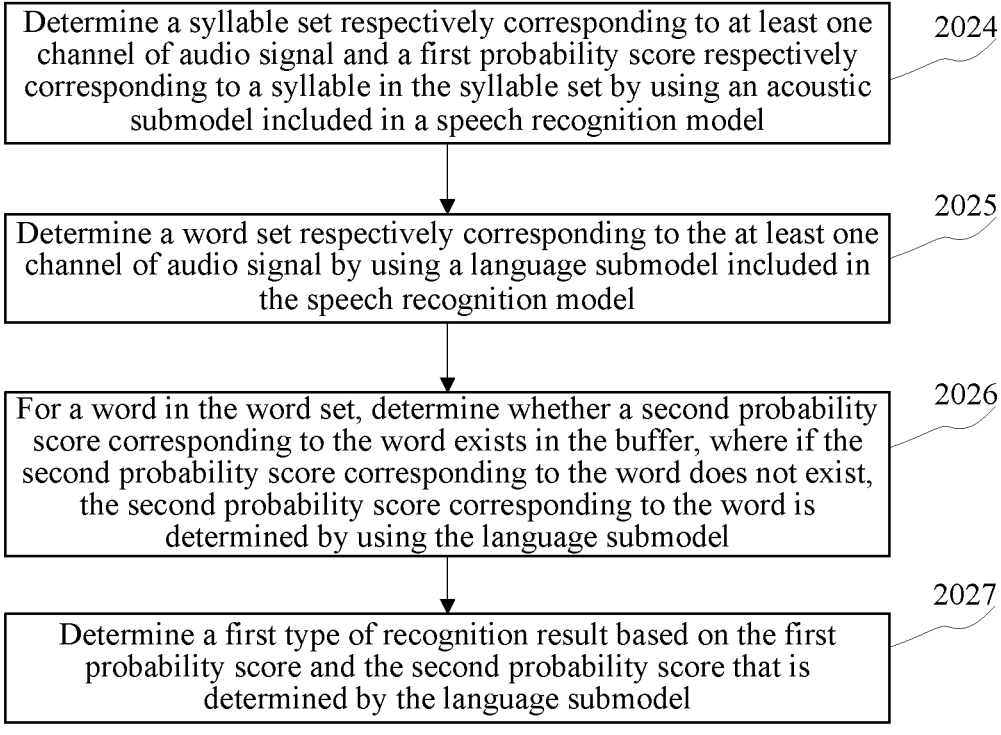

Determine a syllable set respectively corresponding to at least one channel of audio signal and a first probability score respectively corresponding to a syllable in the syllable set by using an acoustic submodel included in a speech recognition model — 2024

Determine a word set respectively corresponding to the at least one channel of audio signal by using a language submodel included in the speech recognition model — 2025

For a word in the word set, determine whether a second probability score corresponding to the word exists in the buffer, where if the second probability score corresponding to the word does not exist, the second probability score corresponding to the word is determined by using the language submodel — 2026

Determine a first type of recognition result based on the first probability score and the second probability score that is determined by the language submodel — 2027

Fig.5

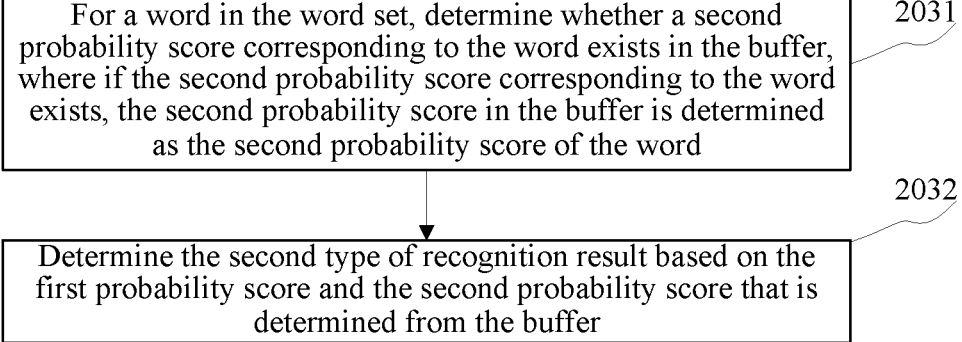

For a word in the word set, determine whether a second probability score corresponding to the word exists in the buffer, where if the second probability score corresponding to the word exists, the second probability score in the buffer is determined as the second probability score of the word — 2031

Determine the second type of recognition result based on the first probability score and the second probability score that is determined from the buffer — 2032

Fig.6

SPEECH INTERACTION METHOD, AND APPARATUS, COMPUTER READABLE STORAGE MEDIUM, AND ELECTRONIC DEVICE

CROSS-REFERENCE TO RELATED APPLICATIONS

This application is a U.S. National Stage Entry under 35 U.S.C. § 371 of International Patent Application No. PCT/CN2022/076422, entitled SPEECH INTERACTION METHOD AND APPARATUS, COMPUTER READABLE STORAGE MEDIUM, AND ELECTRONIC DEVICE, filed Feb. 16, 2022, which claims the benefit of the Chinese patent application No. 202110279812.4, filed with the Chinese Patent Office on Mar. 16, 2021 and entitled "SPEECH INTERACTION METHOD AND APPARATUS, COMPUTER READABLE STORAGE MEDIUM, AND ELECTRONIC DEVICE", the entire disclosures of which are hereby incorporated by reference herein.

TECHNICAL FIELD

The present disclosure relates to the field of computer technologies, and in particular, to a speech interaction method and apparatus, a computer readable storage medium, and an electronic device.

BACKGROUND

With the constant development of artificial intelligence technology, human computer interaction has also been greatly developed. The intelligent speech interaction technology may be applied to various devices such as automobiles, robots, household appliances, central control systems, access control systems, and ATM machines.

For example, in an in-vehicle speech interaction scenario, a speech interaction system usually receives only one-channel of speech signal. Feedback is given to a user after the speech signal is processed. With the development of artificial intelligence technology, the speech interaction system is developed to be more efficient, intelligent, and personalized.

SUMMARY

Embodiments of the present disclosure provide a speech interaction method and apparatus, a computer readable storage medium, and an electronic device.

An embodiment of the present disclosure provides a speech interaction method, the method including: obtaining at least one channel of audio signal; recognizing the at least one channel of audio signal by using a preset speech recognition model, to obtain a first type of recognition result; determining stored recognition data about the at least one channel of audio signal from a buffer; generating a second type of recognition result based on the stored recognition data; processing the first type of recognition result and the second type of recognition result by using the speech recognition model, to obtain at least one statement recognition result respectively corresponding to the at least one channel of audio signal; performing semantic parsing on the at least one statement recognition result, to obtain at least one parsing result; and generating, based on the at least one parsing result, an instruction for controlling a speech interaction device to perform a corresponding function.

According to another aspect of an embodiment of the present disclosure, a speech interaction apparatus is provided. The apparatus includes: an obtaining module, configured to obtain at least one channel of audio signal; a recognition module, configured to recognize the at least one channel of audio signal by using a preset speech recognition model, to obtain a first type of recognition result by using the speech recognition model; a determining module, configured to determine stored recognition data about the at least one channel of audio signal from a buffer; a first generation module, configured to generate a second type of recognition result based on the stored recognition data; a processing module, configured to process the first type of recognition result and the second type of recognition result by using the speech recognition model, to obtain a statement recognition result respectively corresponding to the at least one channel of audio signal; a parsing module, configured to perform semantic parsing on each statement recognition result, to obtain at least one parsing result; and a second generation module, configured to generate, based on the at least one parsing result, an instruction for controlling a speech interaction device to perform a corresponding function.

According to another aspect of an embodiment of the present disclosure, a computer readable storage medium is provided, where the computer readable storage medium stores a computer program, and the computer program is used to implement the foregoing speech interaction method.

According to another aspect of an embodiment of the present disclosure, an electronic device is provided, where the electronic device includes: a processor; and a memory, configured to store processor-executable instructions, where the processor is configured to read the executable instructions from the memory, and execute the instructions to implement the foregoing speech interaction method.

Based on the speech interaction method and apparatus, the computer readable storage medium, and the electronic device provided in the foregoing embodiments of the present disclosure, at least one channel of audio signal is recognized by using the preset speech recognition model, and during the recognition process, the stored recognition data is extracted from the buffer, to generate a part of the recognition result, while the other part of the recognition result is generated by the speech recognition model, so that the stored recognition data is effectively reused, and the speech recognition model is not required to process full data. In this way, processing efficiency for the at least one channel of audio signal is improved, so that requirements on low resource consumption and low processing delay can still be met in a multichannel speech interaction scenario.

The technical solutions of the present disclosure are further described in detail below with reference to the accompanying drawings and embodiments.

BRIEF DESCRIPTION OF THE DRAWINGS

By describing the embodiments of the present disclosure more detailed with reference to the accompanying drawings, the foregoing and other objectives, features, and advantages of the present disclosure will become more apparent. The accompanying drawings are used to provide further understanding of the embodiments of the present disclosure, and constitute a part of the specification to explain the present disclosure together with the embodiments of the present disclosure, but do not constitute limitation to the present disclosure. In the accompanying drawings, the same reference numerals generally represent the same components or steps.

FIG. 2 is a schematic flowchart of a speech interaction method according to an exemplary embodiment of the present disclosure;

FIG. 3 is a schematic flowchart of a speech interaction method according to another exemplary embodiment of the present disclosure;

FIG. 4 is a schematic flowchart of a speech interaction method according to another exemplary embodiment of the present disclosure;

FIG. 5 is a schematic flowchart of a speech interaction method according to another exemplary embodiment of the present disclosure;

FIG. 6 is a schematic flowchart of a speech interaction method according to another exemplary embodiment of the present disclosure;

DETAILED DESCRIPTION OF THE EMBODIMENTS

Figure 1:
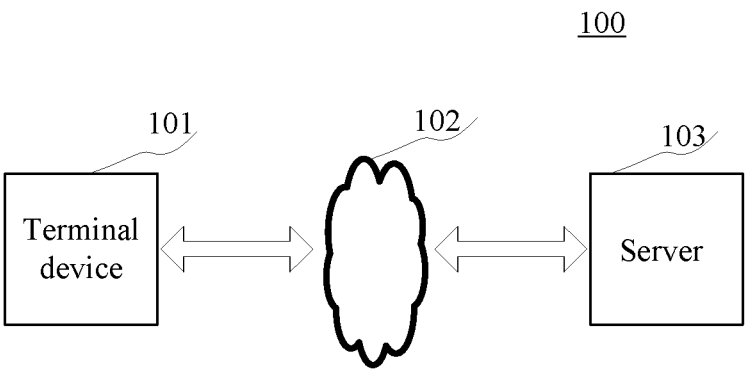
FIG. 1 is a diagram of a system to which the present disclosure is applicable.

Exemplary embodiments of the present disclosure are described below in detail with reference to the accompanying drawings. Obviously, the described embodiments are merely a part, rather than all of embodiments of the present disclosure. It should be understood that the present disclosure is not limited by the exemplary embodiments described herein.

It should be noted that unless otherwise specified, the scope of the present disclosure is not limited by relative arrangement, numeric expressions, and numerical values of components and steps described in these embodiments.

A person skilled in the art may understand that terms such as "first" and "second" in the embodiments of the present disclosure are merely configured to distinguish between different steps, devices, or modules, and indicate neither any particular technical meaning, nor necessarily logical ordering among them.

It should be further understood that, in the embodiments of the present disclosure, the term "multiple/a plurality of" may refer to two or more; and the term "at least one" may refer to one, two, or more.

It should be further understood that, any component, data, or structure involved in the embodiments of the present disclosure may be generally construed to one or more, unless clearly stated or the context indicates otherwise.

In addition, the term "and/or" in the present disclosure refers to only an association relationship that describes associated objects, indicating presence of three relationships. For example, A and/or B may indicate presence of three cases: A alone, both A and B, and B alone. In addition, the character "/" in the present disclosure generally indicates an "or" relationship of associated objects.

It should be further understood that, the descriptions of the various embodiments of the present disclosure focus on differences among the various embodiments. The same or similar parts among the embodiments may refer to one another. For concision, description is not repeated.

Meanwhile, it should be understood that, for ease of description, the accompanying drawings are not necessarily to scale in size of any of parts shown therein.

Descriptions of at least one exemplary embodiment below are actually illustrative only, and never serve as any limitation to the present disclosure along with application or use thereof.

Technologies, methods, and devices known by a person of ordinary skills in the related fields may not be discussed in detail herein. However, where appropriate, the technologies, the methods, and the devices shall be regarded as a part of the specification.

It should be noted that, similar signs and letters in the following accompanying drawings indicate similar items. Therefore, once a certain item is defined in one of the accompanying drawings, there is no need to further discuss the item in the subsequent accompanying drawings.

The embodiments of the present disclosure may be applicable to a terminal device, a computer system, a server, and other electronic devices, which may be operated together with numerous other general-purpose or special-purpose computing system environments or configurations. Well-known examples of the terminal devices, the computing systems, and environment and/or configuration applicable to be used with the terminal device, the computer system, the server, and other electronic devices include but are not limited to: a personal computer system, a server computer system, a thin client, a thick client, a handheld or laptop device, a microprocessor-based system, a set-top box, programmable consumer electronics, a network personal computer, a small computer system, a mainframe computer system, and a distributed cloud computing technology environment including any of the foregoing systems.

The terminal device, the computer system, the server, and other electronic devices may be described in general context of a computer system-executable instruction (such as a program module) executed by the computer system. Generally, the program module may include a routine, a program, a target program, a component, logic, a data structure, and the like that execute particular tasks or implement particular abstract data types. The computer system/server may be implemented in a distributed cloud computing environment. In the distributed cloud computing environment, a task is performed by a remote processing device linked through a communications network. In the distributed cloud computing environment, the program module may be located on a storage medium of a local or remote computing system including a storage device.

Application Overview

The current speech interaction technology can usually process only one-channel speech signal, but cannot process multi-channel speech signals at the same time, and therefore cannot meet requirements on multi-user and personalized speech recognition. Therefore, the technical solutions of the present disclosure need to apply the speech interaction technology to a scenario of multi-channel speech recognition.

At present, a speech recognition model needs to process full data for the speech signal. As a result, efficiency of speech recognition is relatively low, and interaction delay is relatively large. Especially in the scenario of multi-channel speech recognition, multi-user requirements for efficiency and personalization of a speech interaction system cannot be met.

Exemplary System

FIG. 1 shows an exemplary system architecture 100 of a speech interaction method or a speech interaction apparatus to which an embodiment of the present disclosure is applicable.

As shown in FIG. 1, the system architecture 100 may include a terminal device 101, a network 102, and a server 103. The network 102 is used as a medium for providing a communication link between the terminal device 101 and the server 103. The network 102 includes, but is not limited to various connection types, such as wired and wireless communication links, or fiber optic cables.

A user may use the terminal device 101 to interact with the server 103 through the network 102 to receive or send a message. Various communication client applications, such as a speech recognition application, a multimedia application, a search application, a web browser application, a shopping application, and an instant messaging tool may be installed in the terminal device 101.

The terminal device 101 may be an electronic device. The electronic device includes, but is not limited to mobile terminals such as a vehicle-mounted terminal, a mobile phone, a notebook computer, a digital broadcast receiver, a PDA (personal digital assistant), a PAD (a tablet), and a PMP (portable media player), and stationary terminals such as a digital TV, a desktop computer, and a smart home appliance.

The server 103 may be a device that can provide various service functions; for example, it may be a background speech recognition server that recognizes an audio signal uploaded by the terminal device 101. The background speech recognition server may process received audio, so as to obtain an instruction for controlling a speech interaction device, and feed the instruction back to the terminal device 101.

It should be noted that the speech interaction method provided in this embodiment of the present disclosure may be implemented by the server 103, or may be implemented by the terminal device 101. Correspondingly, the speech interaction apparatus may be disposed in the server 103, or may be disposed in the terminal device 101.

It should be understood that quantities of the terminal device 101, the network 102, and the server 103 in FIG. 1 are merely for examples. According to requirements on implementation, any quantity of terminal devices, networks and/or servers may be configured, which is not limited in this application. In addition, when the audio signal does not need to be obtained remotely, the foregoing system architecture may not include the network 102, but only include the server and the terminal device. For example, when the terminal device 101 and the server 103 are connected in a wired manner, the network 102 may be omitted.

Exemplary Method

FIG. 2 is a schematic flowchart of a speech interaction method according to an exemplary embodiment of the present disclosure. The method in this embodiment may be applied to an electronic device (the terminal device 101 or the server 103 shown in FIG. 1). As shown in FIG. 2, the method includes the following steps.

At Step 201, at least one channel of audio signal is obtained.

In this embodiment, the electronic device can obtain one or more audio signals locally or remotely. For example, when this embodiment is applied to an in-vehicle speech recognition scenario, the at least one channel of audio signal may be a speech signal that is of at least one passenger in the vehicle and that is collected by at least one microphone mounted in the vehicle.

At Step 202, the at least one channel of audio signal is recognized by using a preset speech recognition model, to obtain a first type of recognition result by using the speech recognition model.

In this embodiment, the electronic device can recognize the at least one channel of audio signal by using the preset speech recognition model. During a recognition process, the first type of recognition result is obtained by using the preset speech recognition model. The preset speech recognition model may be a model obtained after pre-trained by a large quantity of speech signal samples. The preset speech recognition model is configured to recognize at least one input audio signal, to obtain at least one statement recognition result.

Generally, the preset speech recognition model may include a plurality of submodels; for example, it includes an acoustic submodel, a language submodel, and a decoding network. Further, the acoustic submodel is configured to perform syllable division on the audio signal; the language submodel is configured to convert each syllable into a word; and the decoding network is configured to select an optimal combination from a plurality of words to obtain a sentence.

In the foregoing process of recognizing the one or more audio signals by using the preset speech recognition model in step 202, the electronic device usually can first search a buffer for whether there is recognition data corresponding to a current processing stage. If there is no corresponding recognition data in the buffer, step 202 is performed, to obtain the recognition data, where the recognition data is taken as the first type of recognition result.

At Step 203, stored recognition data about the at least one channel of audio signal is determined from a buffer.

In this embodiment, the electronic device can determine the stored recognition data about the at least one channel of audio signal from the buffer. Usually, in the recognition process of the above-mentioned speech recognition model, the electronic device usually can first search the buffer for whether there is recognition data corresponding to a current processing stage. If yes, the recognition data is extracted.

At Step 204, a second type of recognition result is generated based on the stored recognition data.

In this embodiment, the electronic device can generate the second type of recognition result based on the stored recognition data that is extracted in step 203. For example, the stored recognition data may be taken as the second type of recognition result, or the second type of recognition result may be obtained after certain processing is performed on the stored recognition data. The certain processing process includes scaling the recognition data in a certain proportion and normalizing the recognition data and the like.

It should be noted that the first type of recognition result and the second type of recognition result usually are intermediate results, such as probability scores of syllables and probability scores of words, which are obtained during processing of the speech recognition model.

At Step 205, the first type of recognition result and the second type of recognition result are processed by using the speech recognition model, to obtain a statement recognition result respectively corresponding to the at least one channel of audio signal.

In this embodiment, the electronic device can process the first type of recognition result and the second type of recognition result by using the speech recognition model, to obtain the statement recognition result respectively corresponding to the at least one channel of audio signal. Usually, both the first type of recognition result and the second type of recognition result are intermediate results obtained by the speech recognition model. Therefore, the first type of recognition result and the second type of recognition result need to be further processed by using the speech recognition model.

For example, the first type of recognition result and the second type of recognition result may include a probability score of each syllable and a probability score of each word that are obtained after the audio signal is recognized. For an audio signal, the speech recognition model can use a path search algorithm (such as the Viterbi algorithm) to determine an optimal path from a plurality of recognized words corresponding to the audio signal, and obtain a sentence according to the optimal path to serve as the statement recognition result. If one channel of audio signal may correspond to one statement recognition result, a plurality of audio signals may correspond to a plurality of statement recognition results.

At Step 206, semantic parsing is performed on each statement recognition result, to obtain at least one parsing result.

In this embodiment, the electronic device can perform semantic parsing on each result in the at least one statement recognition result, to obtain at least one parsing result, i.e. one or more parsing results. Each parsing result of the one or more parsing results corresponds to one channel of audio signal. The at least one parsing result may be structured data. For example, when the statement recognition result is "an air-conditioning temperature is set to 25° C.", the corresponding parsing result is "field=vehicle control, intention=air-conditioning temperature setting, slot=<temperature value=25>".

It should be noted that a method for performing semantic parsing on the statement recognition result may be, for example, a rules engine or a neural network engine.

At Step 207, an instruction for controlling a speech interaction device to perform a corresponding function is generated based on the at least one parsing result.

In this embodiment, the electronic device can generate, based on the at least one parsing result, an instruction for controlling the speech interaction device to perform the corresponding function. The speech interaction device may be the foregoing electronic device configured to implement the speech interaction method according to the present disclosure, or may be an electronic device communicatively connected to the foregoing electronic device. For example, when the speech interaction device is a vehicle-mounted air conditioner, if the parsing result is "field=vehicle control, intention=air-conditioning temperature setting, slot=<temperature value=25>", an instruction for controlling the vehicle-mounted air conditioner to be set to a preset temperature may be generated, where the preset temperature is 25° C.

According to the method provided in this embodiment of the present disclosure, at least one channel of audio signal is recognized by using the preset speech recognition model, and during the recognition process, the stored recognition data is extracted from the buffer, to generate a part of the recognition result, while the other part of the recognition result is generated by the speech recognition model, so that the stored recognition data is effectively reused, and the speech recognition model is not required to process full data. In this way, processing efficiency for the at least one channel of audio signal is improved, so that requirements on low resource consumption and low processing delay can still be met in a multi-channel speech interaction scenario.

In some optional implementations, the electronic device can further store the recognition data obtained by the preset speech recognition model in the recognition process into the buffer. Specifically, when there is no recognition data corresponding to a certain recognition step in the buffer, the recognition step needs to be implemented by the speech recognition model, to obtain the recognition data and store the same into the buffer, thereby facilitating subsequent reuse of the recognition data.

In this implementation, the recognition data can be reused by storing the recognition data obtained by the speech recognition model in the recognition process into the buffer, so that the recognition data in the buffer is constantly updated. In addition, more stored recognition data is used in the recognition process of the model, and thus efficiency of speech recognition is further improved.

In some optional implementations, a specific execution process of step 201 is as follows.

First, an initial audio signal collected by an audio collection device is received.

There may be one or more audio collection devices for collecting at least one initial audio signal. The initial audio signal may be a signal that is obtained after the audio collection device collects speech of at least one user. For example, a plurality of audio collection devices are configured. Moreover, each audio collection device is mounted around each seat in the vehicle, and is configured to collect speech of a passenger in the corresponding seat. In this case, a collected audio signal generally includes mixed speech signals of a plurality of users.

Second, acoustic source separation is performed on the initial audio signal, to obtain the at least one channel of audio signal.

A method for the acoustic source separation may be an existing technology. For example, a blind source separation (BSS) algorithm is used to separate the speech signals of a plurality of users, and each obtained audio signal corresponds to one user. In an in-vehicle speech interaction scenario, through the acoustic source separation, each obtained audio signal may also be made corresponding to the corresponding audio collection device. Because each audio collection device is mounted around a corresponding seat, each obtained audio signal may be made corresponding to the corresponding seat. By using the acoustic source separation technology, the speech signals of a plurality of users are separated, and a one-to-one relationship between the separated speech signals and different audio collection devices is established. For a specific implementation process, reference may be made to existing technical methods, and details are not described herein.

In this implementation, by performing acoustic source separation on the initial audio signal, speech of a plurality of users can be separated, so that each subsequent speech recognition result is made corresponding to the corresponding user, thereby improving accuracy of speech interactions of a plurality of users.

In some optional implementations, as shown in FIG. 3, step 202 may include the following steps.

At Step 2021, a speech recognition instance respectively corresponding to each audio signal is determined.

The speech recognition instance may be built by using codes. Each speech recognition instance corresponds to one channel of audio signal, and each speech recognition instance is configured to recognize the corresponding audio signal.

At Step 2022, various determined speech recognition instances are concurrently executed.

For example, the various speech recognition instances may be concurrently executed in a multithreading way. Alternatively, the various speech recognition instances may also be executed by different CPUs, so as to implement concurrent execution.

At Step 2023, through each speech recognition instance, the corresponding audio signal is recognized respectively by using the preset speech recognition model.

Specifically, the various speech recognition instances can concurrently invoke the preset speech recognition model respectively to recognize the corresponding speech signal, thereby implementing concurrent recognition for audio signals. Usually, when recognizing at least one channel of audio signal, a speech recognition model to be preset may be loaded into a memory first, and the various speech recognition instances share the preset speech recognition model. It should be noted that the foregoing buffer may be shared when the audio signal is recognized by using each speech recognition instance, thereby improving recognition efficiency for each speech recognition instance.

In this implementation, through building the speech recognition instance corresponding to each audio signal and concurrently executing the various speech recognition instances, the speech of a plurality of users may be recognized at the same time. Meanwhile, the various speech recognition instances share one speech recognition model to recognize the speech signal, and share the same buffer to store and invoke the recognition data. In this way, concurrent speech recognition of at least one channel of audio signal is implemented, and resources required for the recognition are shared, thereby improving efficiency of speech recognition in a multi-user speech interaction scenario. Because the recognized data has been stored in the shared buffer, the stored recognition data may be directly invoked in a subsequent recognition process without repeated recognition, thereby greatly saving memory resources.

In some optional implementations, as shown in FIG. 4, step 206 may include the following steps.

At Step 2061, a semantic parsing instance respectively corresponding to each obtained statement recognition result is determined.

The semantic parsing instance may be built by using codes. Each semantic parsing instance corresponds to a statement recognition result corresponding to one channel of audio signal, and each semantic parsing instance is configured to perform structural parsing on the statement recognition result.

At Step 2062, various determined semantic parsing instances are concurrently executed.

For example, the various semantic parsing instances may be concurrently executed in a multithreading way. Alternatively, the various semantic parsing instances may also be executed by different CPUs, so as to implement concurrent execution.

At Step 2063, semantic parsing is performed on the corresponding statement recognition result respectively by using each semantic parsing instance.

Specifically, the various semantic parsing instances can concurrently invoke modules such as a preset rules engine and a preset neural network engine, to implement parallel parsing of the statement recognition results.

In this implementation, through building the semantic parsing instance corresponding to each statement recognition result and concurrently executing the various semantic parsing instances, the speech of a plurality of users is recognized and parsed at the same time. In this way, a plurality of links for simultaneous speech interaction are built. Moreover, the various semantic parsing instances share one set of semantic resources, and therefore speech recognition efficiency in a multi-user speech interaction scenario is improved.

Further, referring to FIG. 5, FIG. 5 shows a schematic flowchart of a speech interaction method according to still another embodiment. In this embodiment, as shown in FIG. 5, based on the foregoing embodiment shown in FIG. 2, step 202 may include the following steps.

At Step 2024, a syllable set respectively corresponding to the at least one channel of audio signal and a first probability score respectively corresponding to a syllable in the syllable set are determined by using an acoustic submodel included in the speech recognition model.

The acoustic submodel is configured to perform syllable division on the audio signal. For example, the acoustic submodel includes, but is not limited to a hidden markov model (HMM) and a Gaussian mixture model (GMM). The first probability score is used to represent a probability at which a syllable is correctly divided.

At Step 2025, a word set respectively corresponding to the at least one channel of audio signal is determined by using a language submodel included in the speech recognition model.

The language submodel is configured to determine the word set based on the syllable set. For example, the language submodel may include, but is not limited to an n-gram language model and a neural network language model.

At Step 2026, for a word in the word set, it is determined whether a second probability score corresponding to the word exists in the buffer.

If the second probability score corresponding to the word does not exist in the buffer, the second probability score corresponding to the word is determined by using the language submodel. The second probability score is used to represent a probability at which the recognized word appears. For example, a calculated probability at which a word "air conditioner" appears after a word "turn on" is a second probability score corresponding to the word "air conditioner".

When a probability score of a certain word needs to be determined, the electronic device first searches the buffer for whether there is a second probability score of the current word. When the second probability score does not exist in the buffer, the second probability score of the word is calculated by using the language submodel. In this embodiment, the language submodel has a large amount of data for processing. Therefore, to save processing overhead, the second probability score generated by the language submodel is pre-stored by using the buffer, so that the second probability score can be directly obtained from the buffer during use.

At Step 2027, the first type of recognition result is determined based on the first probability score and the second probability score that is determined by the language submodel.

For example, each first probability score and each second probability score may be determined as the first type of recognition results.

The language submodel has a large amount of data for processing. Therefore, according to the method provided in the foregoing corresponding embodiment of FIG. 5, the buffer is dedicated to storing the second probability score generated by the language submodel, so that a function of the buffer is more purposeful. In other words, the buffer is purposefully applied to a process with a large amount of data for processing and with frequent data access, to make full use of the buffer to save computing resources, thereby reducing redundant data in the buffer and improving efficiency of speech recognition.

Further, referring to FIG. 6, FIG. 6 shows a schematic flowchart of a speech interaction method according to still another embodiment. In this embodiment, as shown in FIG. 6, based on the foregoing embodiment shown in FIG. 5, step 203 may further include the following steps.

At Step 2031, for a word in the word set, it is determined whether a second probability score corresponding to the word exists in the buffer.

If the second probability score corresponding to the word exists in the buffer, the second probability score in the buffer is determined as the second probability score of the word.

For example, when a probability at which a word "air conditioner" appears after a word "turn on" needs to be calculated, before the calculation, the buffer is first searched for whether a calculated second probability score corresponding to the word "air conditioner" has been stored. The second probability score is directly accessed from the buffer if it has been stored, so as to avoid repeated calculation. The second probability score cannot be directly accessed from the buffer if it has not been stored, and thus calculation of the second probability score is required.

At Step 2032, the second type of recognition result is determined based on the first probability score and the second probability score that is determined from the buffer.

For example, each first probability score and each second probability score that is determined from the buffer may be determined as the second type of recognition results.

According to the method provided in the foregoing corresponding embodiment of FIG. 6, when determining a second probability score corresponding to a word, the second probability score is first searched in the buffer, and the found second probability score is determined as the second probability score of the word. In this way, a calculation amount of the language submodel is reduced more purposefully, and memory resources occupied during a recognition process of the language submodel can also be reduced, thereby further improving the efficiency of speech recognition.

In some optional implementations, based on the foregoing embodiment corresponding to FIG. 5 or FIG. 6, step 205 may be implemented as follows.

First, a target path of the word set is determined in a decoding network included in the speech recognition model based on the first probability score and the second probability score that are respectively included in the first type of recognition result and the second type of recognition result.

The decoding network is a network built based on the word set. Based on the network, an optimal path of a word combination may be searched in the network based on the first probability score and the second probability score, and this path is the target path.

It should be noted that the method for determining an optimal path based on a probability score corresponding to a syllable and a probability score corresponding to a word is an existing technology, and details are not described herein.

Subsequently, the statement recognition result respectively corresponding to the at least one channel of audio signal is generated based on the target path.

Specifically, a sentence composed of words corresponding to the target path may be determined as the statement recognition result.

According to this implementation, the target path is searched in the decoding network by using the first probability score, the second probability score calculated by the language submodel, and the second probability score extracted from the buffer, to generate the statement recognition result. In this way, the stored second probability score in the buffer is fully utilized during decoding, and efficiency of generating the statement recognition result is improved.

Figure 7:
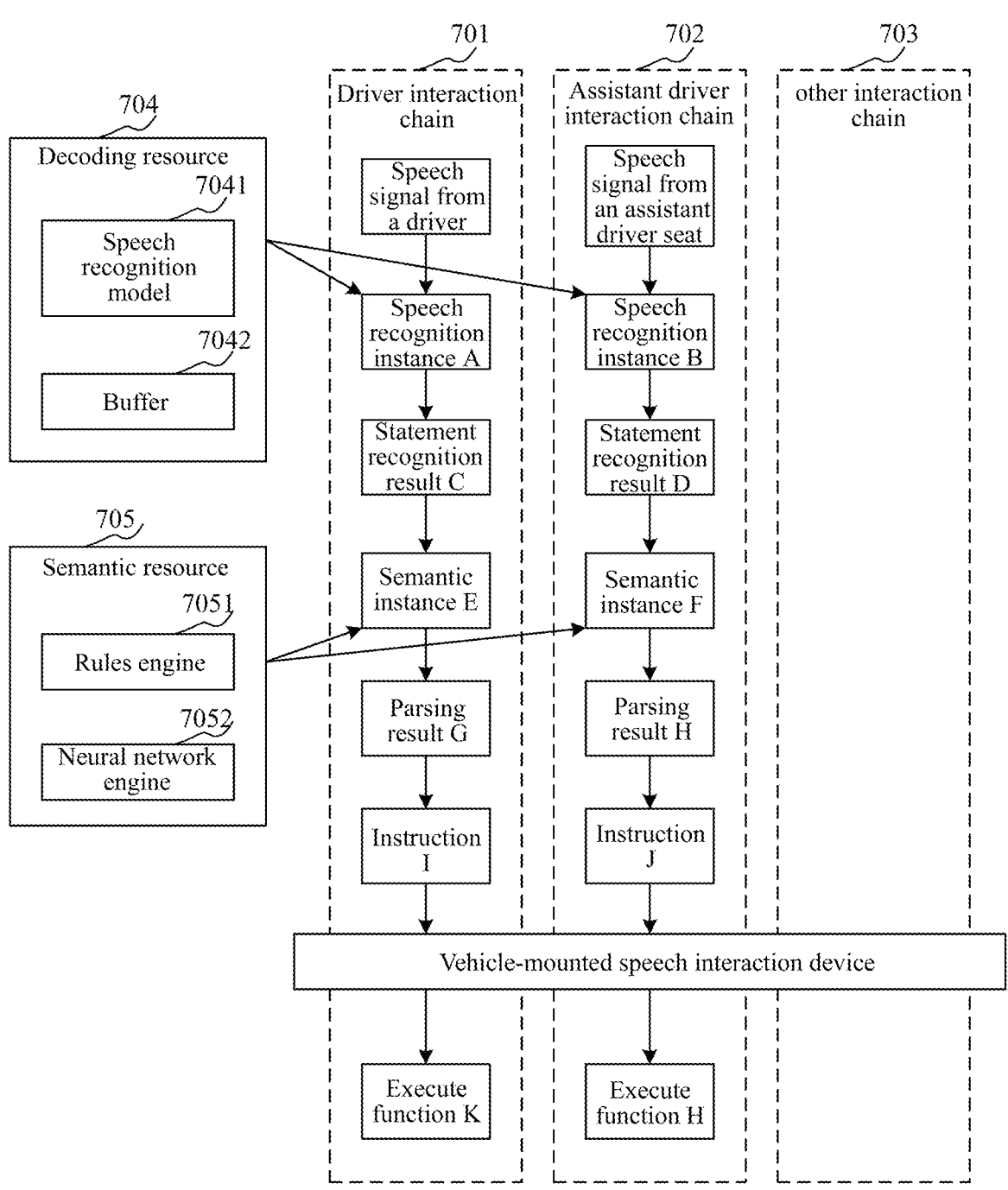
FIG. 7 is a schematic diagram of an application scenario of a speech interaction method according to an embodiment of the present disclosure.

Referring to FIG. 7, FIG. 7 shows a schematic diagram of an application scenario of a speech interaction method according to this embodiment. In the application scenario in FIG. 7, the speech interaction method is applied to an in-vehicle speech interaction system.

As shown in FIG. 7, a plurality of audio signals respectively correspond to one interaction chain which includes a driver interaction chain 701, an assistant driver interaction chain 702, and other interaction chain 703. The driver interaction chain 701 is used for a driver to interact with the in-vehicle speech interaction system. The assistant driver interaction chain 702 is used for a passenger in an assistant driver seat to interact with the in-vehicle speech interaction system. The other interaction chain 703 is used for a passenger(s) in other seat(s) to interact with the in-vehicle speech interaction system.

In addition, a decoding resource 704 includes a speech recognition model 7041 and a buffer 7042. A semantic resource 705 includes a rules engine 7051 and a neural network engine 7052. The rules engine 7051 is configured to parse the statement recognition result. It may be learned from FIG. 7 that in the driver interaction chain 701, the electronic device generates a speech recognition instance A for a speech signal from the driver, and generates a speech recognition instance B for a speech signal from the assistant driver seat. The speech recognition instances share one set of decoding resource 704 and are concurrently executed, to obtain a statement recognition result C and a statement recognition result D.

Subsequently, the electronic device builds a semantic instance E and a semantic instance F. The semantic instance E and the semantic instance F share one set of semantic resources, and respectively parse the statement recognition result C and the statement recognition result D, to obtain a structured parsing result G and a structured parsing result H.

Further, the electronic device generates an instruction I and an instruction J based on the parsing result G and the parsing result H. For example, the instruction I is used for opening an air conditioner, and the instruction J is used for closing a vehicle window. A vehicle-mounted speech interaction device executes corresponding function K and function H based on the instruction I and the instruction J. Similarly, an execution process of the other interaction chain 703 is similar to those of the driver interaction chain 701 and the assistant driver interaction chain 702, and details are not described herein again.

Exemplary Apparatus

Figure 8:
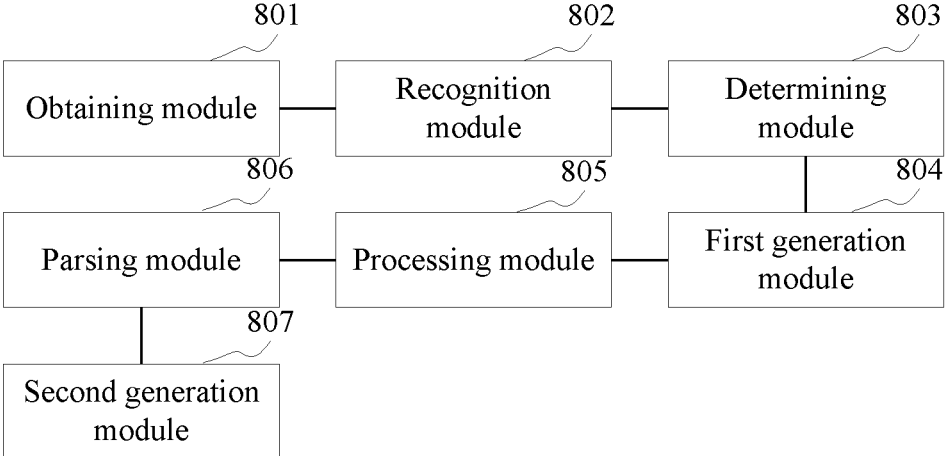
FIG. 8 is a schematic structural diagram of a speech interaction apparatus according to an exemplary embodiment of the present disclosure.

FIG. 8 is a schematic structural diagram of a speech interaction apparatus according to an exemplary embodiment of the present disclosure. This embodiment may be applied to an electronic device. As shown in FIG. 8, the speech interaction apparatus includes an obtaining module 801, a recognition module 802, a determining module 803, a first generation module 804, a processing module 805, a parsing module 806, and a second generation module 807.

The obtaining module 801 is configured to obtain at least one channel of audio signal. The recognition module 802 is configured to recognize the at least one channel of audio signal by using a preset speech recognition model, to obtain a first type of recognition result by using the speech recognition model. The determining module 803 is configured to determine stored recognition data about the at least one channel of audio signal from a buffer. The first generation module 804 is configured to generate a second type of recognition result based on the stored recognition data. The processing module 805 is configured to process the first type of recognition result and the second type of recognition result by using the speech recognition model, to obtain a statement recognition result respectively corresponding to the at least one channel of audio signal. The parsing module 806 is configured to perform semantic parsing on each statement recognition result, to obtain at least one parsing result. The second generation module 807 is configured to generate, based on the at least one parsing result, an instruction for controlling a speech interaction device to perform a corresponding function.

In this embodiment, the obtaining module 801 can obtain at least one channel of audio signal locally or remotely. For example, when this embodiment is applied to an in-vehicle speech recognition scenario, the at least one channel of audio signal may be a speech signal that is of at least one passenger in the vehicle and that is collected by at least one microphone mounted in the vehicle.

In this embodiment, the recognition module 802 can recognize the at least one channel of audio signal by using the preset speech recognition model, to obtain the first type of recognition result by using the speech recognition model. The speech recognition model may be a model pre-trained by a large quantity of speech signal samples. The speech recognition model is configured to recognize an input audio signal, to obtain a statement recognition result.

Usually, the speech recognition model may include a plurality of submodules, such as an acoustic submodel (which is configured to perform syllable division on an audio signal), a language submodel (which is configured to convert each syllable into a word), and a decoding network (which is configured to select an optimal combination from a plurality of words to obtain a sentence).

In a recognition process of the speech recognition model, the recognition module 802 usually searches the buffer for recognition data corresponding to a current processing stage. If there is no corresponding recognition data in the buffer, recognition is performed by using the speech recognition model, and obtained recognition data is taken as the first type of recognition result.

In this embodiment, the determining module 803 can determine the stored recognition data about the at least one channel of audio signal from the buffer. In the recognition process of the speech recognition model, the determining module 803 usually can first search the buffer for whether there is recognition data corresponding to a current processing stage. If the corresponding recognition data exists in the buffer, the recognition data is extracted.

In this embodiment, the first generation module 804 can generate the second type of recognition result based on the stored recognition data that is extracted. For example, the stored recognition data may be taken as the second type of recognition result, or the second type of recognition result may be obtained after certain processing (for example, scaling the data in a certain proportion and normalizing the data) is performed on the stored recognition data.

It should be noted that the first type of recognition result and the second type of recognition result usually are intermediate results, such as probability scores of syllables and probability scores of words, which are obtained during processing of the speech recognition model.

In this embodiment, the processing module 805 can process the first type of recognition result and the second type of recognition result by using the speech recognition model, to obtain the statement recognition result respectively corresponding to the at least one channel of audio signal. Usually, because the first type of recognition result and the second type of recognition result are intermediate results obtained after the processing of the speech recognition model, the speech recognition model needs to further process the first type of recognition result and the second type of recognition result. For example, the first type of recognition result and the second type of recognition result may include a probability score of each syllable and a probability score of each word that are obtained after the audio signal is recognized. For an audio signal, the speech recognition model can use a path search algorithm (such as the Viterbi algorithm) to determine an optimal path from a plurality of recognized words corresponding to the audio signal, and obtain a sentence to serve as the statement recognition result.

In this embodiment, the parsing module 806 can perform semantic parsing on each statement recognition result, to obtain at least one parsing result, i.e. one or more parsing results. Each parsing result in the one or more parsing results corresponds to one channel of audio signal. Usually, the parsing result may be structured data. For example, when the statement recognition result is "an air-conditioning temperature is set to 25° C.", the parsing result is "field=vehicle control, intention=air-conditioning temperature setting, slot=<temperature value=25>".

It should be noted that the method for parsing a statement is an existing technology. For example, a rules engine or a neural network engine may be used.

In this embodiment, the second generation module 807 can generate, based on the at least one parsing result, an instruction for controlling the speech interaction device to perform the corresponding function. The speech interaction device may be an electronic device configured with the foregoing speech interaction apparatus, or may be an electronic device communicatively connected to the foregoing electronic device. For example, when the speech interaction device is a vehicle-mounted air conditioner, if the parsing result is "field=vehicle control, intention=air-conditioning temperature setting, slot=<temperature value=25>", an instruction for controlling the vehicle-mounted air conditioner to be set to 25° C. may be generated.

Figure 9:
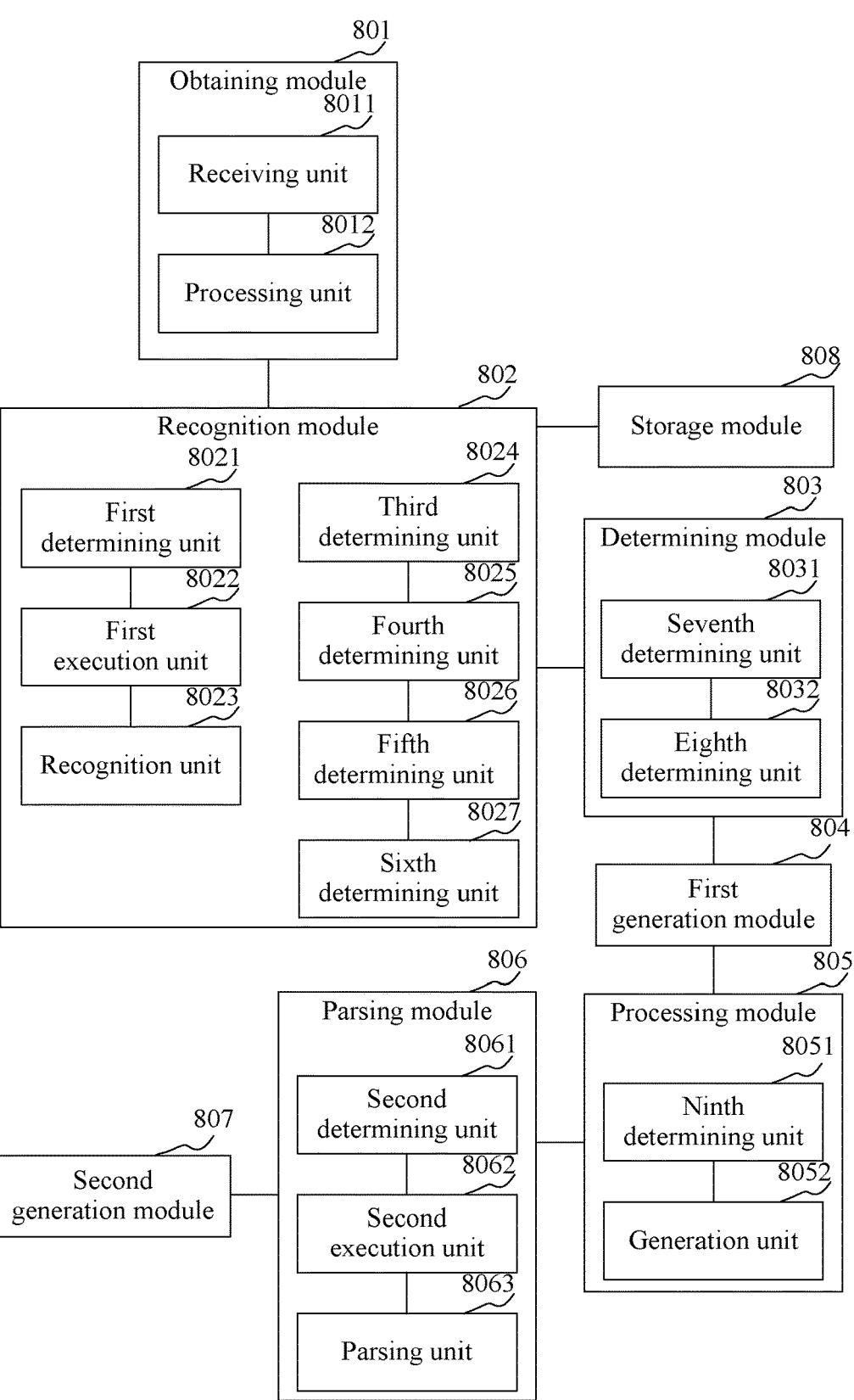
FIG. 9 is a schematic structural diagram of a speech interaction apparatus according to another exemplary embodiment of the present disclosure.

Referring to FIG. 9, FIG. 9 is a schematic structural diagram of a speech interaction apparatus according to another exemplary embodiment of the present disclosure.

In some optional implementations, the apparatus further includes a storage module 808 that is configured to store the recognition data that is obtained in the recognition process by the speech recognition model into the buffer.

In some optional implementations, the obtaining module 801 includes: a receiving unit 8011 that is configured to receive an initial audio signal collected by an audio collection device; and a processing unit 8012 that is configured to perform acoustic source separation on the initial audio signal, to obtain at least one channel of audio signal.

In some optional implementations, the recognition module 802 includes: a first determining unit 8021 that is configured to determine a speech recognition instance respectively corresponding to the at least one channel of audio signal; a first execution unit 8022 that is configured to concurrently execute various determined speech recognition instances; and a recognition unit 8023 that is configured to recognize, through each speech recognition instance, the corresponding audio signal respectively by using the speech recognition model.

In some optional implementations, the parsing module 806 includes: a second determining unit 8061 that is configured to determine a semantic parsing instance respectively corresponding to each obtained statement recognition result; a second execution unit 8062 that is configured to concurrently execute various determined semantic parsing instances; and a parsing unit 8063 that is configured to perform semantic parsing on the corresponding statement recognition result respectively by using each semantic parsing instance.

In some optional implementations, the recognition module 802 includes: a third determining unit 8024 that is configured to determine a syllable set respectively corresponding to the at least one channel of audio signal and a first probability score corresponding to a syllable in the syllable set by using an acoustic submodel included in the speech recognition model; a fourth determining unit 8025 that is configured to determine a word set respectively corresponding to the at least one channel of audio signal by using a language submodel included in the speech recognition model; a fifth determining unit 8026 that is configured to determine, for a word in the word set, whether a second probability score corresponding to the word exists in the buffer, where if the second probability score corresponding to the word does not exist in the buffer, the second probability score corresponding to the word is determined by using the language submodel; and a sixth determining unit 8027 that is configured to determine the first type of recognition result based on the first probability score and the second probability score that is determined by the language submodel.

In some optional implementations, the determining module 803 includes: a seventh determining unit 8031 that is configured to determine, for a word in the word set, whether a second probability score corresponding to the word exists in the buffer, where if the second probability score corresponding to the word exists in the buffer, the second probability score in the buffer is determined as the second probability score of the word; and an eighth determining unit 8032 that is configured to determine the second type of recognition result based on the first probability score and the second probability score that is determined from the buffer.

In some optional implementations, the processing module 805 includes: a ninth determining unit 8051 that is configured to determine a target path of the word set in a decoding network included in the speech recognition model based on the first probability score and the second probability score that are respectively included in the first type of recognition result and the second type of recognition result; and a generation unit 8052 that is configured to generate the statement recognition result respectively corresponding to the at least one channel of audio signal based on the target path.

According to the speech interaction apparatus provided in the foregoing embodiment of the present disclosure, at least one channel of audio signal is recognized by using the preset speech recognition model, and during the recognition process, the stored recognition data is extracted from the buffer, to generate a part of the recognition result, while the other part of the recognition result is generated by the speech recognition model, so that the stored recognition data is effectively reused, and the speech recognition model is not required to process full data. In this way, processing efficiency for the at least one channel of audio signal is improved, so that requirements on low resource consumption and low processing delay can still be met in a multi-channel speech interaction scenario.

Exemplary Electronic Device

An electronic device according to an embodiment of the present disclosure is described below with reference to FIG. 10. The electronic device may be any one or two of the terminal device 101 and the server 103 shown in FIG. 1, or a stand-alone device independent from the terminal device 101 and the server 103. The stand-alone device may communicate with the terminal device 101 and the server 103, to receive a collected input signal therefrom.

Figure 10:
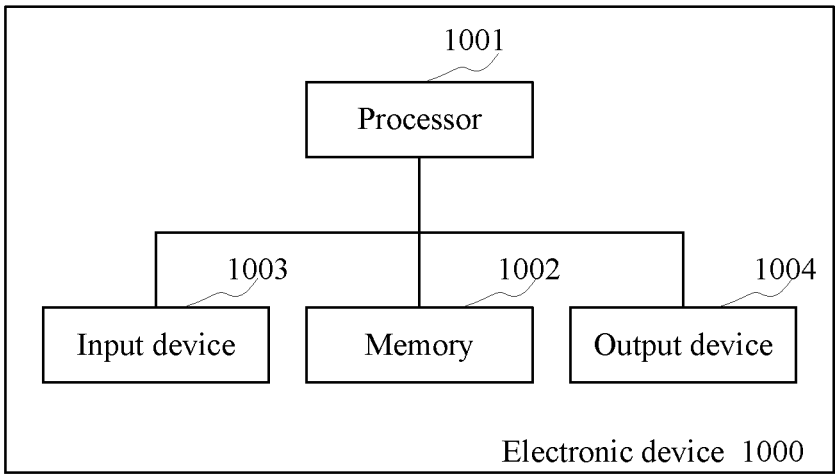
FIG. 10 is a structural diagram of an electronic device according to an exemplary embodiment of the present disclosure.

FIG. 10 shows a block diagram of an electronic device according to an embodiment of the present disclosure.

As shown in FIG. 10, an electronic device 1000 includes at least one processor 1001 and at least one memory 1002.

Any processor of the at least one processor 1001 may be a central processing unit (CPU) or another form of processing unit having a data processing capability and/or an instruction execution capability, and may control other components in the electronic device 1000 to perform a desired function.

The memory 1002 may include one or more computer program products. The computer program product may include various forms of computer readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer readable storage medium. The processor 1001 can run the program instruction, to implement the speech interaction method according to the foregoing various embodiments of the present disclosure and/or other desired functions. Various contents such as recognition data can also be stored in the computer readable storage medium.

For example, the electronic device 1000 can further include an input device 1003 and an output device 1004. These components are connected with each other through a bus system and/or another form of connection mechanism (not shown).

For example, when the electronic device is the terminal device 101 or the server 103, the input device 1003 may be a device such as a microphone for inputting an audio signal. When the electronic device is a stand-alone device, the input device 1003 may be a communication network connector, and is configured to receive the input audio signal from the terminal device 101 and the server 103.

The output device 1004 can output various information to the outside, including instructions for the speech interaction device to perform corresponding functions. The output device 1004 may include, for example, a display, a loudspeaker, a printer, and a communication network and a remote output device connected by the communication network.

Certainly, for simplicity, FIG. 10 shows only some of components in the electronic device 1000 that are related to the present disclosure, and components such as a bus and an input/output interface are omitted. In addition, according to specific application situations, the electronic device 1000 may further include any other appropriate components.

Exemplary Computer Program Product and Computer Readable Storage Medium

In addition to the foregoing method and device, the embodiments of the present disclosure may further relate to a computer program product, which includes a computer program instruction. When the computer program instruction is executed by a processor, the processor is enabled to perform the steps, of the speech interaction method according to the embodiments of the present disclosure, that are described in the "exemplary method" section of this specification.

The computer program product may be program codes, written with one or any combination of a plurality of programming languages, that are configured to perform the operations in the embodiments of the present disclosure. The programming languages include an object-oriented programming language such as Java or C++, and further include a conventional procedural programming language such as a "C" language or a similar programming language. The program codes may be entirely or partially executed on a user computing device, executed as an independent software package, partially executed on the user computing device and partially executed on a remote computing device, or entirely executed on the remote computing device or a server.

In addition, the embodiments of the present disclosure may further relate to a computer readable storage medium, which stores computer program instructions. When the computer program instructions are executed by the processor, the processor is enabled to perform the steps, of the speech interaction method according to the embodiments of the present disclosure, that are described in the "exemplary method" section of this specification.

The computer readable storage medium may be one readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, apparatus or device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

Basic principles of the present disclosure are described above with reference to the specific embodiments. However, it should be pointed out that the advantages, superiorities, and effects mentioned in the present disclosure are merely examples but are not for limitation, and it cannot be considered that these advantages, superiorities, and effects are necessary for each embodiment of the present disclosure. In addition, specific details of the above disclosure are merely for examples and for ease of understanding, rather than limitations. The foregoing details do not limit that the present disclosure must be implemented by using the foregoing specific details.

The various embodiments in this specification are all described in a progressive way, and each embodiment focuses on a difference from other embodiments. For the same or similar parts among the various embodiments, reference may be made to each other. The system embodiments basically correspond to the method embodiments, and thus they are relatively simply described. For related parts, reference may be made to a part of the descriptions of the method embodiments.

The block diagrams of the equipment, the apparatus, the device, and the system involved in the present disclosure are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system may be connected, arranged, and configured in an arbitrary manner. The terms such as "include", "contain", and "have" are open terms that mean "including but not limited to", and may be used interchangeably with "including but not limited to". The terms "or" and "and" used herein refer to the term "and/or", and may be used interchangeably with "and/or", unless the context clearly indicates otherwise. The terms "such as" and "for example" used herein refers to the phrase "such as but not limited to", and may be used interchangeably with "such as but not limited to".

The method and the apparatus in the present disclosure may be implemented in many ways. For example, the method and the apparatus in the present disclosure may be implemented by software, hardware, firmware, or any combination of the software, the hardware, and the firmware. The foregoing sequence of the steps of the method is for illustration only, and the steps of the method in the present disclosure are not limited to the sequence specifically described above, unless otherwise specifically stated in any other manner. In addition, in some embodiments, the present disclosure may also be implemented as programs recorded in a recording medium. These programs include machine-readable instructions for implementing the method according to the present disclosure. Therefore, the present disclosure further relates to a recording medium storing a program for implementing the method according to the present disclosure.

It should be further pointed out that, various components or various steps in the apparatus, the device, and the method of the present disclosure may be disassembled and/or recombined. These disassembled and/or recombined components or steps shall be regarded as equivalent solutions of the present disclosure.

The foregoing description about the disclosed aspects is provided, so that the present disclosure can be arrived at or carried out by any person skilled in the art. Various modifications to these aspects are very obvious to a person skilled in the art. Moreover, general principles defined herein may be applicable to other aspects without departing from the scope of the present disclosure. Therefore, the present disclosure is not intended to be limited to the aspect illustrated herein, but to the widest scope consistent with the principles and novel features disclosed herein.

The foregoing description has been given for illustration and description. In addition, this description is not intended to limit the embodiments of the present disclosure to forms disclosed herein. Although a plurality of exemplary aspects and embodiments have been discussed above, a person skilled in the art may recognize certain variations, modifications, changes, additions, and sub-combinations thereof.

What is claimed is:

1. A speech interaction method, including:

obtaining at least one channel of audio signal;

recognizing the at least one channel of audio signal by using a preset speech recognition model, to obtain a first type of recognition result;

determining stored recognition data about the at least one channel of audio signal from a buffer;

generating a second type of recognition result based on the stored recognition data;

decoding the first type of recognition result and the second type of recognition result by using a decoding network included in the speech recognition model, to obtain at least one statement recognition result corresponding to the at least one channel of audio signal;

performing semantic parsing on the at least one statement recognition result, to obtain at least one parsing result; and generating, based on the at least one parsing result, an instruction for controlling a speech interaction device to perform a corresponding function;

wherein the recognizing the at least one channel of audio signal by using a preset speech recognition model, to obtain a first type of recognition result includes:

determining a syllable set respectively corresponding to the at least one channel of audio signal and a first probability score corresponding to a syllable in the syllable set by using an acoustic submodel included in the speech recognition model;

determining a word set respectively corresponding to the at least one channel of audio signal by using a language submodel included in the speech recognition model;

determining, based on a word in the word set, whether a second probability score corresponding to the word exists in the buffer;

if the second probability score corresponding to the word does not exist in the buffer, determining the second probability score corresponding to the word by using the language submodel; and determining the first probability score and the second probability score that is determined by the language submodel as the first type of recognition result;

wherein the determining stored recognition data about the at least one channel of audio signal from the buffer, generating a second type of recognition result based on the stored recognition data, comprises:

if the second probability score corresponding to the word exists in the buffer, determining the second probability score in the buffer as the second probability score of the word; and determining the first probability score and the second probability score that is determined from the buffer as the second type of recognition result.

2. The method according to claim 1, wherein the obtaining at least one channel of audio signal includes:

receiving an initial audio signal collected by an audio collection device; and performing acoustic source separation on the initial audio signal, to obtain the at least one channel of audio signal.

3. The method according to claim 1, wherein the recognizing the at least one channel of audio signal by using a preset speech recognition model, to obtain a first type of recognition result includes:

determining a speech recognition instance respectively corresponding to the at least one channel of audio signal;

concurrently executing various determined speech recognition instances; and through each speech recognition instance, recognizing the corresponding audio signal respectively by using the speech recognition model.

4. The method according to claim 3, wherein the performing semantic parsing on the statement recognition result, to obtain at least one parsing result includes:

determining a semantic parsing instance respectively corresponding to each obtained statement recognition result;

concurrently executing various determined semantic parsing instances; and performing semantic parsing on the corresponding statement recognition result respectively by using each semantic parsing instance, to obtain the at least one parsing result.

5. The method according to claim 4, wherein performing semantic parsing on the corresponding statement recognition result respectively by using each semantic parsing instance, to obtain the at least one parsing result includes:

concurrently invoking a preset rules engine and a preset neural network engine by each semantic parsing instance, to implement parallel parsing of the statement recognition results.

6. The method according to claim 4, wherein the various semantic parsing instances share one set of semantic resources.

7. The method according to claim 3, wherein through each speech recognition instance, recognizing the corresponding audio signal respectively by using the speech recognition model includes:

loading a present speech recognition model into a memory;

sharing the preset speech recognition model by each speech recognition instance to recognize the at least one channel of audio signal, and sharing a same buffer to store and invoke the recognition data by each speech recognition instance.

8. The method according to claim 1, wherein the decoding the first type of recognition result and the second type of recognition result by using a decoding network included in the speech recognition model, to obtain at least one statement recognition result corresponding to the at least one channel of audio signal includes:

determining a target path of the word set in the decoding network included in the speech recognition model based on the first probability score and the second probability score that are respectively included in the first type of recognition result and the second type of recognition result; and generating the at least one statement recognition result corresponding to the at least one channel of audio signal based on the target path.

9. The method according to claim 8, wherein the determining a target path of the word set in the decoding network included in the speech recognition model based on the first probability score and the second probability score that are respectively included in the first type of recognition result and the second type of recognition result, includes:

searching an optimal path of a word combination in the decoding network based on the first probability score and the second probability score, and taking this path as the target path.

10. The method according to claim 1, wherein the recognizing the at least one channel of audio signal by using a preset speech recognition model, to obtain a first type of recognition result includes:

during recognizing the at least one channel of audio signal, searching the buffer for whether there is recognition data corresponding to a current processing stage, and if there is no corresponding recognition data in the buffer, performing the recognition, to obtain the recognition data which is taken as the first type of recognition result.

11. The method according to claim 1, wherein the determining stored recognition data about the at least one channel of audio signal from a buffer includes:

during recognizing the at least one channel of audio signal, searching the buffer for whether there is recognition data corresponding to a current processing stage; and if there is the recognition data corresponding to the current processing stage, extracting the recognition data.

12. The method according to claim 1, wherein the generating a second type of recognition result based on the stored recognition data includes:

taking the recognition data as the second type of recognition result, or obtaining the second type of recognition result after certain processing is performed on the recognition data.

13. The method according to claim 1, further including storing the recognition data obtained by the preset speech recognition model during recognizing the at least one channel of audio signal into the buffer.

14. A non-transitory computer readable storage medium, storing a computer program which, when executed, implements a speech interaction method, the method including:

obtaining at least one channel of audio signal;

recognizing the at least one channel of audio signal by using a preset speech recognition model, to obtain a first type of recognition result;

determining stored recognition data about the at least one channel of audio signal from a buffer;

generating a second type of recognition result based on the stored recognition data;

decoding the first type of recognition result and the second type of recognition result by using a decoding network included in the speech recognition model, to obtain at least one statement recognition result corresponding to the at least one channel of audio signal;

performing semantic parsing on the at least one statement recognition result, to obtain at least one parsing result; and generating, based on the at least one parsing result, an instruction for controlling a speech interaction device to perform a corresponding function, wherein the recognizing the at least one channel of audio signal by using a preset speech recognition model, to obtain a first type of recognition result includes:

determining a syllable set respectively corresponding to the at least one channel of audio signal and a first probability score corresponding to a syllable in the syllable set by using an acoustic submodel included in the speech recognition model;

determining a word set respectively corresponding to the at least one channel of audio signal by using a language submodel included in the speech recognition model;

determining, based on a word in the word set, whether a second probability score corresponding to the word exists in the buffer;

if the second probability score corresponding to the word does not exist in the buffer, determining the second probability score corresponding to the word by using the language submodel; and determining the first probability score and the second probability score that is determined by the language submodel as the first type of recognition result;

wherein the determining stored recognition data about the at least one channel of audio signal from the buffer, generating a second type of recognition result based on the stored recognition data, comprises:

if the second probability score corresponding to the word exists in the buffer, determining the second probability score in the buffer as the second probability score of the word; and determining the first probability score and the second probability score that is determined from the buffer as the second type of recognition result.

15. An electronic device, wherein the electronic device includes: one or more processors; and a memory, configured to store processor-executable instructions, wherein the processor is configured to read the executable instructions from the memory, and execute the instructions to implement a speech interaction method which includes:

obtaining at least one channel of audio signal;

recognizing the at least one channel of audio signal by using a preset speech recognition model, to obtain a first type of recognition result;

determining stored recognition data about the at least one channel of audio signal from a buffer;

generating a second type of recognition result based on the stored recognition data;

decoding the first type of recognition result and the second type of recognition result by using a decoding network included in the speech recognition model, to obtain at least one statement recognition result corresponding to the at least one channel of audio signal;

performing semantic parsing on the at least one statement recognition result, to obtain at least one parsing result; and generating, based on the at least one parsing result, an instruction for controlling a speech interaction device to perform a corresponding function;

wherein the recognizing the at least one channel of audio signal by using a preset speech recognition model, to obtain a first type of recognition result includes:

determining a syllable set respectively corresponding to the at least one channel of audio signal and a first probability score corresponding to a syllable in the syllable set by using an acoustic submodel included in the speech recognition model;

determining a word set respectively corresponding to the at least one channel of audio signal by using a language submodel included in the speech recognition model;

determining, based on a word in the word set, whether a second probability score corresponding to the word exists in the buffer;

if the second probability score corresponding to the word does not exist in the buffer, determining the second probability score corresponding to the word by using the language submodel; and determining the first probability score and the second probability score that is determined by the language submodel as the first type of recognition result;

wherein the determining stored recognition data about the at least one channel of audio signal from the buffer, generating a second type of recognition result based on the stored recognition data, comprises:

if the second probability score corresponding to the word exists in the buffer, determining the second probability score in the buffer as the second probability score of the word; and determining the first probability score and the second probability score that is determined from the buffer as the second type of recognition result.

* * * * *